A. O. Bourn,

Manf Elastic Rolls.

No. 109,579.  Patented Nov. 29, 1870.

WITNESSES.  INVENTOR.

Orville Peckham  Augustus O. Bourn
Peter F. Hughes ately mixed,

United States Patent Office.

AUGUSTUS O. BOURN, OF PROVIDENCE, RHODE ISLAND.

Letters Patent No. 109,579, dated November 29, 1870.

IMPROVEMENT IN ELASTIC ROLLERS FOR WRINGERS, &c.

The Schedule referred to in these Letters Patent and making part of the same.

*To all whom it may concern:*

Be it known that I, AUGUSTUS O. BOURN, of the city and county of Providence, in the State of Rhode Island, have invented a new and useful Improvement in Elastic Rollers for Wringing-Machines and for other purposes; and I do hereby declare that the following specification, taken in connection with the drawing making a part of the same, is a full, clear, clear, and exact description thereof.

Figure 1:
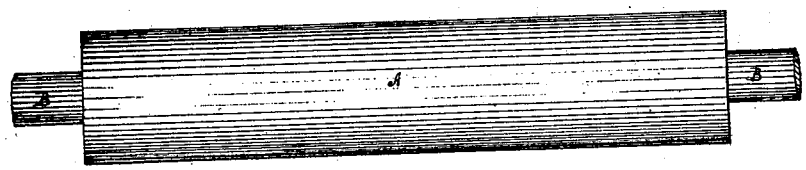
Figure 1 is a view of the roller in perspective.
Figure 2:
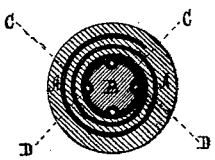
Figure 2 is a transverse section.
Figure 3:
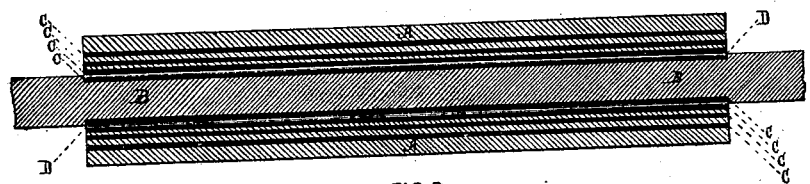
Figure 3 is a longitudinal section.

In the manufacture of elastic rollers for wringing-machines and for other purposes, where the roller is required to be mounted upon and attached to a shaft, various means have been resorted to for combining the rubber, which possesses little tensile strength, with canvas or some other material having sufficient capacity to resist the tearing strain to which such rollers in their use are subjected.

My invention has no reference to the mechanical devices for attaching the elastic roller to its shaft, although a convenient means for doing this is shown in the drawing; but It relates entirely to a method of constructing the rubber body of the roller which will enable it to be secured firmly to the shaft by several of the common modes of making such mechanical attachment.

I propose to construct the roller partly of the ordinary rubber manufactured for such purpose, and partly of fibrous rubber, or rubber in which grained cotton or other vegetable fiber is intimately mixed, or, in place of the latter, to employ those compositions which, when vulcanized, make what is known as hard rubber, which possesses great resisting power; and I so arrange these two materials that the former shall constitute the outer surface of the roller, and the latter shall furnish the resistance to the twisting strain of the shaft. Such two compositions, though differing in their respective qualities of tensile strength, are, nevertheless, homogeneous in character, vulcanizable at the same temperature, and capable of forming one united mass, incapable of peeling apart.

In the drawing—

A represents that portion of the roller which is made of soft rubber, whitened usually by the admixture of the oxide of zinc or other agent.

B is the driving-shaft of iron.

C, the portion of the roller which is made of rubber, and cloth ground up and made into a plastic mass, or it may represent a composition which, when vulcanized, will form hard rubber.

In case rubber mixed with fibrous matter is to be used, the refuse cuttings of rubber cloth will be found to be convenient and economical.

D represents wire rods attached to the shaft, the same being one of several known mechanical means for attaching the roller to the shaft.

The mixed rubber and fibrous composition, (or the hard-rubber composition substituted therefor,) and the white-rubber composition are to be respectively rolled into sheets in a way familiar to manufacturers of rubber.

The end of the sheets of fibrous rubber or hard-rubber composition C is to be wound around the shaft B, and the wires D, if the mechanical devices for securing the roller to the shaft shown in the drawing are employed, or if other means for securing the roller are used, is to be applied to the points where the strain occasioned by turning the shaft first comes upon the roller.

The sheet of rubber A is next to be overlaid upon what remains of the sheet C, and the two are to be wound together around the shaft, fold upon fold; the sheet of white rubber being always of the greater length, so as to form an outer yielding surface for the roller. The roller so made up is next to be vulcanized by heat in the common way.

It will be well understood by those conversant with the manufacture, that the two compositions described as composing the elastic roller will unite perfectly, and, when vulcanized, the portion C will be capable of resisting any strain to which it will be subjected in practical use without tearing away from the shaft fastenings, or peeling from the white rubber portion.

What I claim as my invention, and desire to secure by Letters Patent, is—

The improvement in the construction of elastic rollers for wringing-machines and for other purposes, which consists in winding, so as to form a roller to be subsequently vulcanized, a sheet of ground rubber and cloth, C, (or, instead thereof, a sheet of rubber compound, which, when vulcanized, will become hard rubber,) in combination with a sheet of ordinary soft rubber A, such two materials being disposed with respect to each other, so as to form a roller substantially as described, for the purposes specified.

Witnesses:    AUGUSTUS O. BOURN.

PETER F. HUGHES,
ORVILLE PECKHAM.